United States Patent
Yoshida et al.

[11] Patent Number: 5,891,413
[45] Date of Patent: Apr. 6, 1999

[54] METHOD OF PRODUCING A CARBIDE FROM AN ORGANIC SUBSTANCE CONTAINING WATER

[75] Inventors: Yutaka Yoshida, Nagano; Masaki Okabe, 4-4-11, Karasaki, Otsu-shi, Shiga-ken; Masakatsu Ozawa, Fujieda, all of Japan

[73] Assignee: Masaki Okabe, Shiga-ken, Japan

[21] Appl. No.: 882,304

[22] Filed: Jun. 25, 1997

[30] Foreign Application Priority Data

Feb. 6, 1997 [JP] Japan .................................. 9-038301

[51] Int. Cl.⁶ .................................................. C01B 31/30
[52] U.S. Cl. .............................................. 423/439; 423/440
[58] Field of Search ......................... 423/439, 440

[56] References Cited

U.S. PATENT DOCUMENTS 3,480,395  11/1969  McMullen et al. ................. 423/440
4,317,659  3/1982  Down .................................. 423/439

FOREIGN PATENT DOCUMENTS 52-33824  8/1977  Japan .
53-3501   2/1978  Japan .
8-22477   3/1996  Japan .

*Primary Examiner*—Michael Lewis
*Assistant Examiner*—Stuart L. Hendrickson
*Attorney, Agent, or Firm*—Rabin & Champagne, P.C.

[57] ABSTRACT

A method of continuously producing a carbide from a moisture-containing organic substance allows for the recycling of the organic substance, which is conventionally thrown away waste. The method includes a dewatering process for removing water from the moisture containing material. A moisture adjustment process removes more water from a dewatered cake. A carbonization process continuously carbonizes the moisture adjusted material. During the moisture adjustment process, a carbide produced during the carbonization process is mixed in the dewatered cake to remove the moisture therefrom.

17 Claims, 5 Drawing Sheets

METHOD OF PRODUCING A CARBIDE FROM AN ORGANIC SUBSTANCE CONTAINING WATER

BACKGROUND OF THE INVENTION

The present invention relates to a method of continuously producing a carbide from an organic substance containing water.

Water-containing organic substances, such as sludge cakes or the lees of wine, spirits, and beer, are sometimes recycled as compost, or burned and subsequently buried in the ground. However, these methods of disposal have several disadvantages. For example, compost is costly to produce, because it requires an expensive deodorizing device for removing the obnoxious smell generated during the fermentation process. Furthermore, recycling this substance as compost is inefficient, because the compost only decreases the volume by about 10% to about 20%. On the other hand, burning the organic substances is costly and often not practical, because a great amount of heat is needed to burn these substances, which may contain more than 90% water. Thus, the above-mentioned substances are typically disposed of in the sea or ground without being processed at all.

It is also known to carbonize these organic substances. The conventional method carbonizes the organic substances using an incomplete combustion, or using a continuous combustion performed under 500° C. However, this conventional method produces a large quantity of air-polluting and malodorous smoke, and therefore requires a device for processing the smoke. Further, the carbide thus produced by the conventional method is very volatile, and is therefore limited in its application.

SUMMARY OF THE INVENTION

It is an object of the present invention to provide an improved method which allows for water-containing organic substances to be recycled, rather than being disposed of as waste.

This and other objects are accomplished by the provision of providing a method, in which a carbide is continuously produced from the water-containing organic substances.

The method includes a pressing process for removing water from a material to form a dewatered cake. A moisture adjustment process removes further water from the dewatered cake. A carbonization process carbonizes the moisture-adjusted material. The moisture adjustment process includes mixing a carbide formed by the carbonization process.

The present invention produces the carbide by carbonizing organic substances, which otherwise would have been unprocessed and discarded in the sea. Thus, environmental pollution is reduced, and the organic substances are recycled.

BRIEF DESCRIPTION OF THE DRAWINGS

Other objects, features, and advantages of the present invention will become apparent from the following detailed description of the preferred but non-limiting embodiments. The description is made with reference to the accompanying drawings, in which.

DETAILED DESCRIPTION OF THE INVENTION

Figure 1:
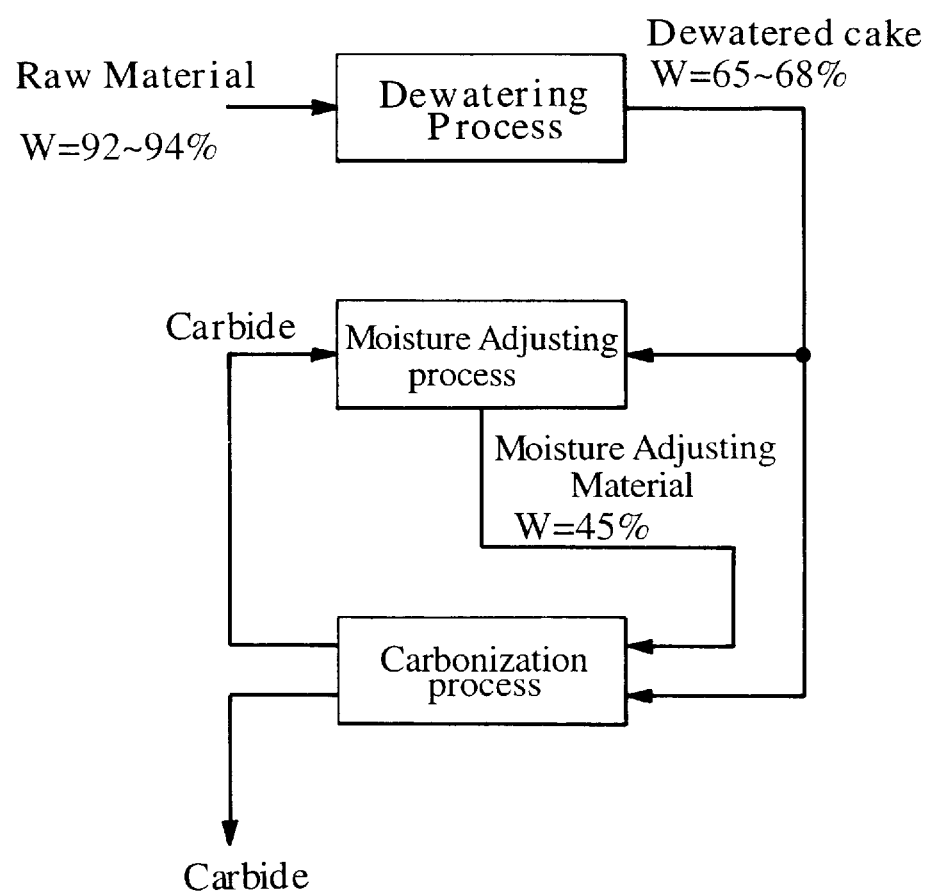
FIG. 1 is a block diagram illustrating the processes of the invention.

As shown in FIG. 1, the invention comprises a dewatering process for removing water from a raw material, such as a sludge cake or the lees of wine, spirits or beer. The dewatering process can be performed using, for example, a pressing machine, which produces a dewatered cake. A moisture adjusting process is then performed, for removing the moisture from the dewatered cake. A carbonization process is then performed, for continuously carbonizing the moisture adjusted material. Although the dewatered cake from the dewatering process can be processed without performing the moisture adjusting process, it is preferred if the moisture adjusting process is performed first.

Figure 2:
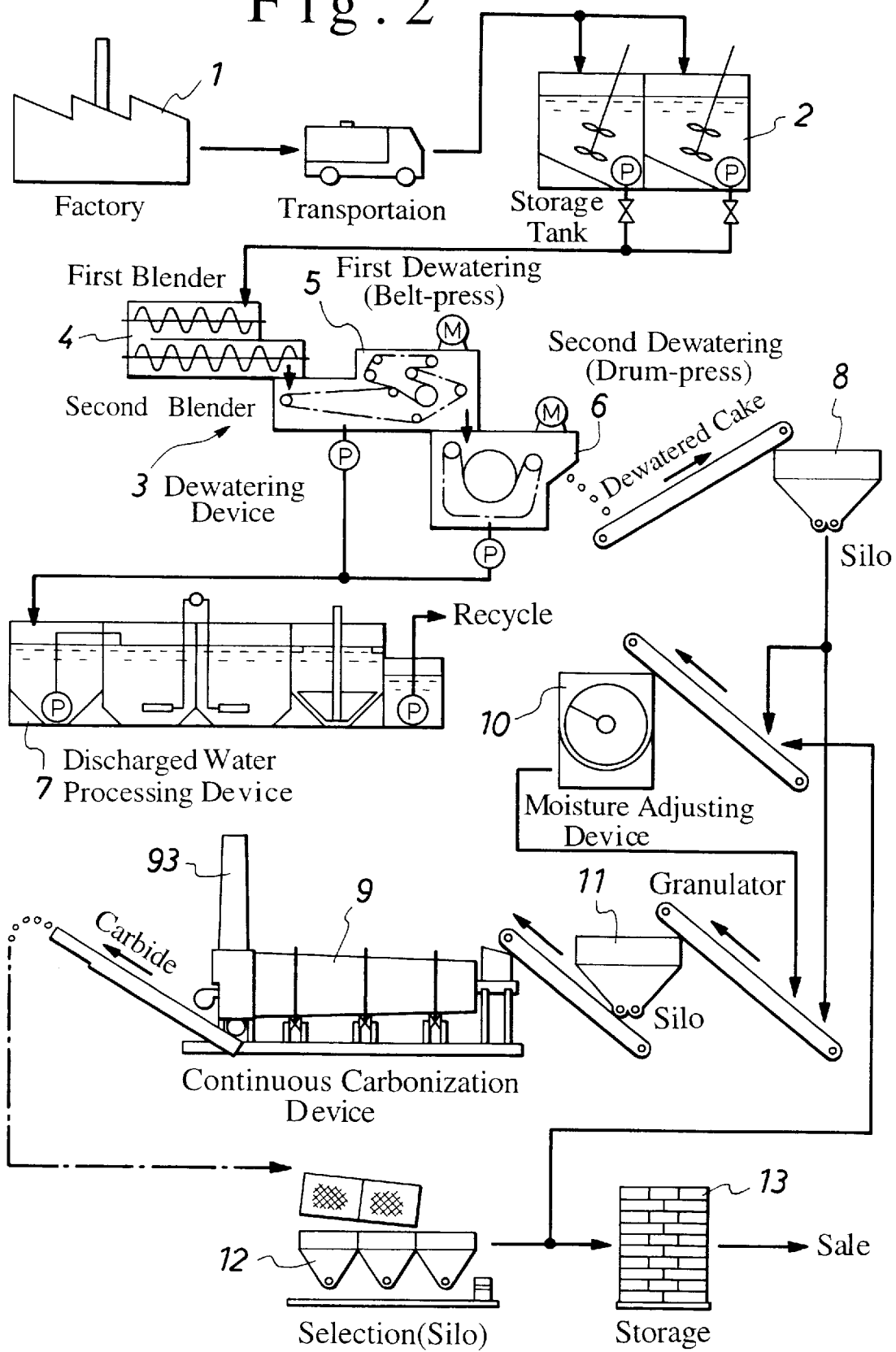
FIG. 2 is a flow chart showing the devices used to implement the processes of the invention.

Referring to FIG. 2, the raw material discharged from a factory 1 is gathered into a storage tank 2, wherein the average moisture content is between 92% and 94%.

The raw material in the storage tank 2 is sent by a pump to a dewatering device 3, which reduces the average moisture content to between 65% and 68%, by separating the raw material into a filtrate and a dewatered cake. The dewatering device 3 may be similar to that disclosed by Japanese Patent Nos. 2,127,055, 907,864, and 926,951, and may include a stirrer 4, and first and second dewatering means, 5 and 6, respectively. The stirrer 4 mixes the material with an injected coagulant, and comprises, for example, first and second screw-type blenders. The type and amount of the coagulant differs according to the kind of the material being processed. Therefore, a detailed description of the coagulant is omitted herein.

The first dewatering means 5 can be, for example, a belt-press machine, which creates a low-pressure dewatering area. The second dewatering means 6 can be, for example, a drum-press machine, which creates a high-pressure dewatering area.

The filtrate separated by the dewatering device 3 is sent to a discharged water processing device 7, to be recycled and used as water for industrial purposes.

The dewatered cake coming from the dewatering device 3 is gathered into a silo 8. A portion of the dewatered cake is sent from the silo 8 to a carbonization device 9. The remaining portion of the dewatered cake is sent to a moisture adjustment device 10.

Moisture adjustment device 10 processes the portion of the dewatered cake received therein, prior to its carbonization, by adjusting the moisture content of the cake to about 45%. In this embodiment, a carbide produced by the invention is mixed into the dewatered cake to reduce the moisture in the cake, thereby accelerating the carbonization process.

Although the cake itself has a odor, once carbide is mixed with the dewatered cake, the smell is lessened. Therefore, the dewatered cake and carbide mixture (i.e., the moisture adjusted material) can be utilized as a fertilizer or a soil conditioner without performing the carbonization process.

The moisture adjusted material may be sent directly to a silo 11 for feeding to a carbonization device 9. However, it is preferable if the material is first granulated, and thereafter sent to the carbonization device 9.

Figure 3:
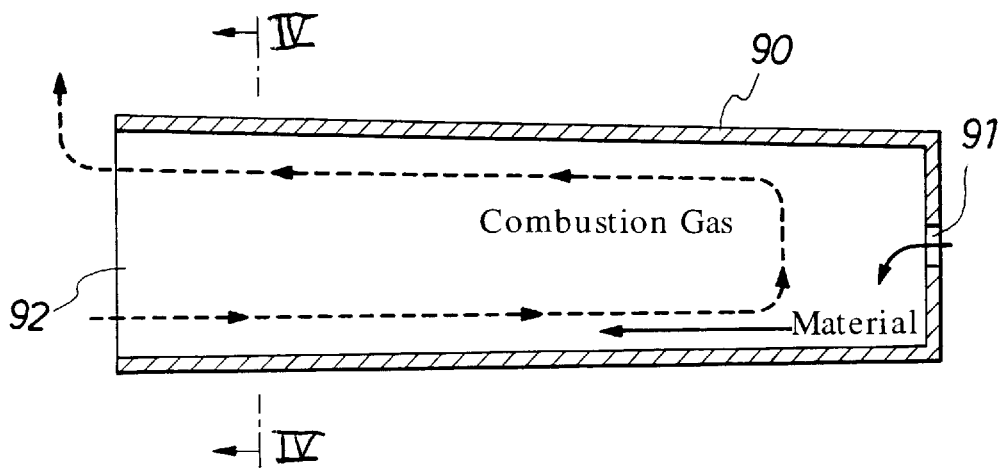
FIG. 3 is a sectional view of a furnace of a carbonizing device according to the present invention.
Figure 4:
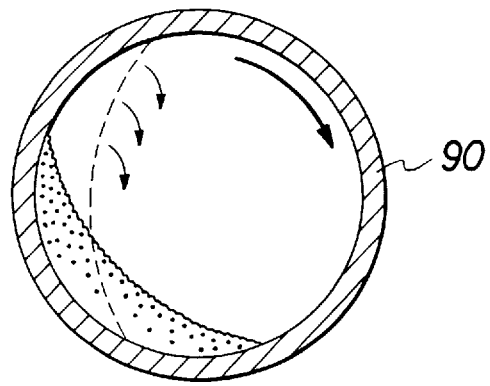
FIG. 4 is a sectional view taken along the line IV—IV of FIG. 3.

As shown in FIGS. 3 and 4, the carbonization device 9 has a rotatably-mounted, inner-tapered furnace 90. The furnace 90 has an inlet 91 at the smaller diameter portion thereof, through which the material is fed into the furnace, and an outlet 92 at the larger diameter portion thereof. A burner and a blower, not shown, are mounted at the outlet side. When the moisture adjusted material is injected into the furnace 90 thought the inlet 91, the material is automatically sent toward the outlet 92 while being stirred. The carbonization device 9 may be similar to the carbonization device disclosed by Japanese Patent No. 2,549,481.

Contact of the moisture adjusted material with the inner wall of the rotating furnace 90 causes the moisture adjusted material to dry.

The material is burned in the furnace 90 using an emitted volatile gas. An intermediate combustion atmosphere is formed by supplying an amount of air which will cause neither incineration nor incomplete combustion. For this purpose, the blower is controlled so as to blow a minimum amount of air necessary, to the most violent combustion section of the furnace, to prevent the incineration of the material.

The carbide thus produced is removed from the furnace 90 and quickly cooled at a normal temperature. This procedure causes any volatile matter in the carbide to be completely volatilized, thus producing a high-quality porous carbide. Cooling the carbide again places the carbide into its most stable condition.

Inside of the tapered furnace 90, air is naturally drawn from the outlet side (which has the larger diameter) and through the furnace and toward the inlet side, where it is then recirculated back toward the outlet side, as shown by the dashed line in FIG. 3. This causes the exhaust, such as combustion gas, odor, and smoke generated during the primary combustion period, to pass through the hottest section in the furnace where the carbide material is burning. The exhaust thus undergoes a secondary combustion, causing the exhaust to become odorless and smokeless.

The amount of material injected in the furnace 90 is adjusted according to the degree of granulation and the percentage of moisture it contains. Control of the revolution speed of the furnace, and of the injected amount of the material, is necessary, because the combustion temperature in the furnace 90 must be at a sufficiently high temperature. Carbonization at a high temperature allows for the continuous production of an essentially non-volatile, porous carbide.

Any emitted exhaust heat due to the combustion process can be recovered for subsequent use. A heat exchanger (not shown), for example, a water-cooled heat-exchanger, may be installed at the bottom of a chimney 93 used for discharging the exhaust gas. The heat exchanger will lower the temperature of the exhaust gas, and simultaneously radiate the heat, using a radiator, from a cooling water. The radiated heat may be as high as about 80° C. to 100° C. The radiated heat can be used to preliminarily dry the material to be carbonized. Any odor and vapor produced during the preliminary drying operation is preferably recovered, and fed into the furnace 90. The furnace 90 will deodorize and vaporize such odors and vapors before they are discharged into the air.

The carbide produced by the carbonization device 9 is accommodated in a carbide silo 12, where it may be sorted before being made into a final product 13. As described above, a portion of the carbide may also be supplied to the moisture adjusting device 10.

Experiment of the Production of Carbide.

Figure 5:
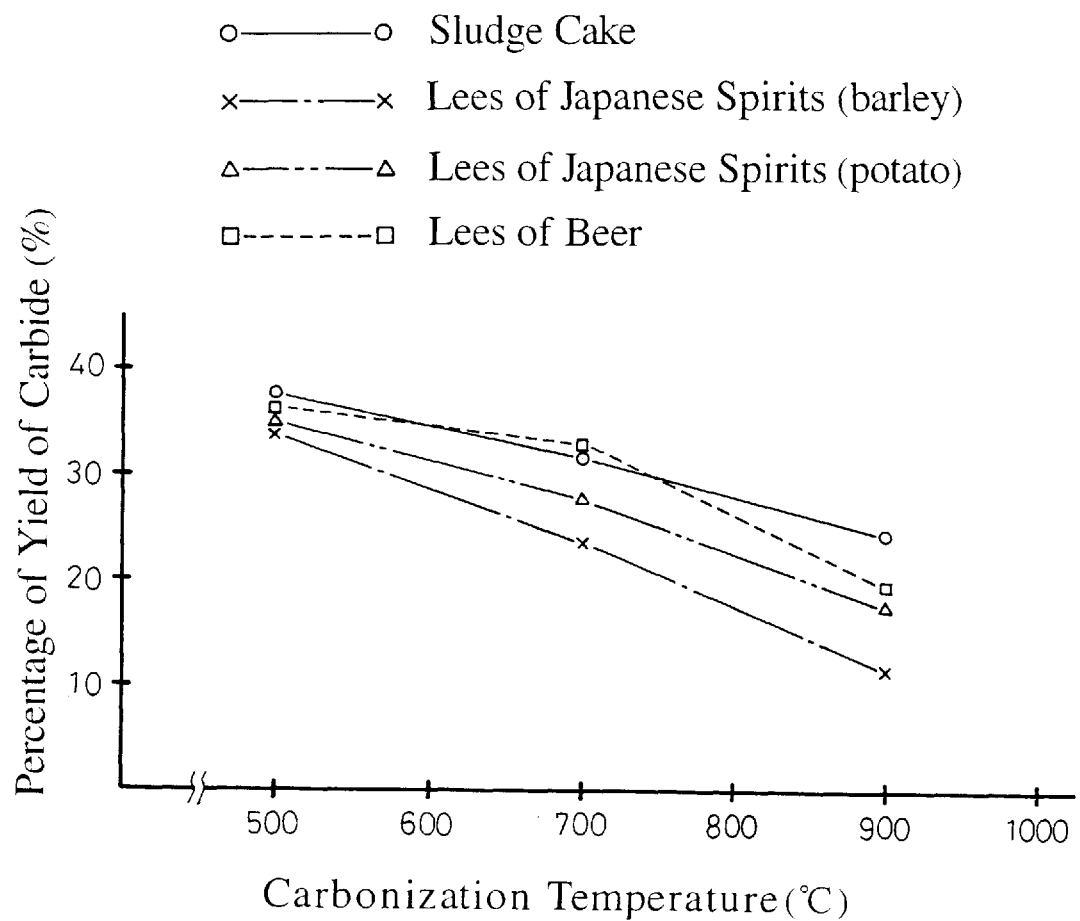
FIG. 5 is a graph showing the percentage of yield versus the carbonization temperature.
Figure 6:
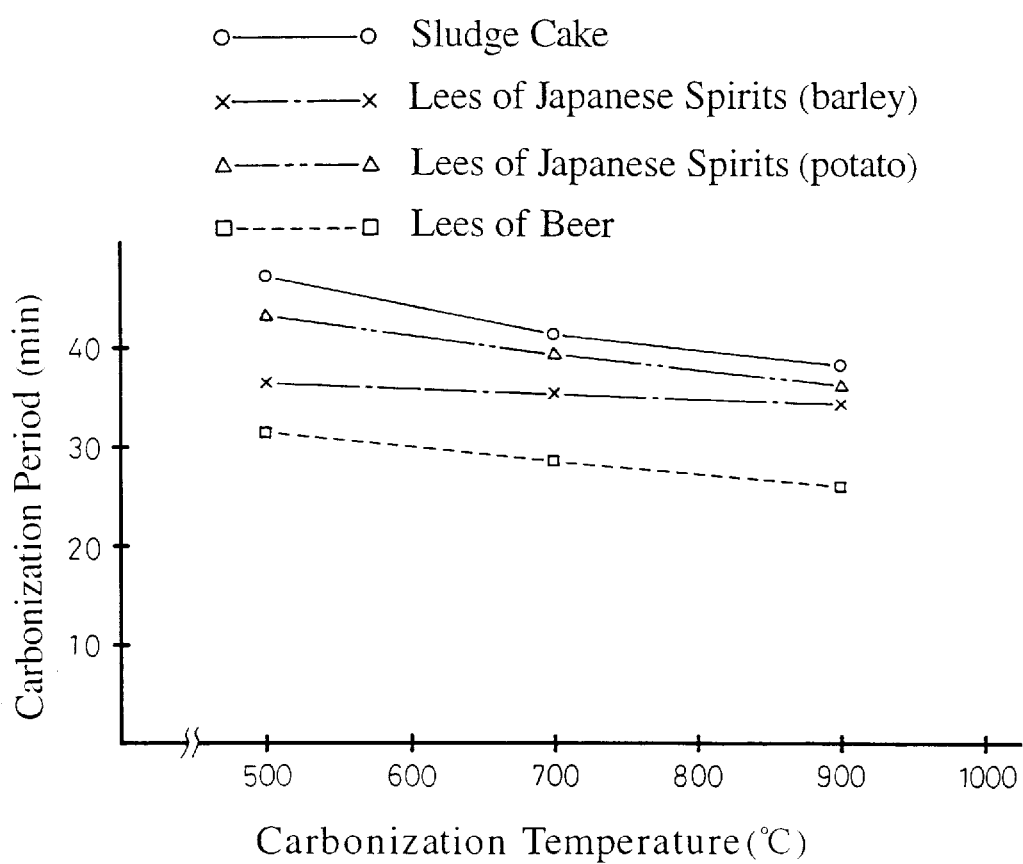
FIG. 6 is a graph showing the relationship between the carbonization temperature and the carbonization period.

FIGS. 5 and 6 show examples of an experiment conducted, in which the carbonization process according to the present invention was performed on a dewatered sludge cake, the lees of a Japanese distilled spirit, i.e. shochu (made from barley and potato), and the lees of beer.

FIG. 5 is a graph of the percent yield of carbide versus the carbonization temperature. This graph also shows the ratio of the produced carbide to the type of material used. FIG. 6 is a graph of the relationship between the carbonization temperature and the carbonization period.

As shown in FIG. 5, as the carbonization temperature rises, the percent yield of carbide is lowered, with the rate of decline being greater in the range of 700° C. to 900° C., and less in the range of 500° C. to 700° C.

As shown in FIG. 6, as the temperature rises, less time is needed to carbonize the material. However, between the range of 700° C. and 900° C., the carbonization period is not significantly lowered with an increase in temperature. As discovered by the inventors' experiments, a temperature in the range of 500° C. to 700° C. yields the largest amount of carbide, while saving fuel.

The carbide produced by the invention can be used in various fields. For example, it can be used as the material for a medical mattress, a soil conditioner, a water purifier, a freshness-maintaining agent for vegetables, a building material, a livestock feed, a compost, and a deodorant.

The invention now being fully described, it will be apparent to one of ordinary skill in the art that any changes and modifications can be made thereto without departing from the spirit or scope of the invention as set forth in the claims.

What is claimed is:

1. A method of producing a carbide from a water-containing organic substance, comprising:

performing a dewatering process, to reduce a moisture content of a water-containing organic substance from the range of about 92% to about 94%, to the range of about 65% to about 68%, and form a dewatered cake;

performing a moisture adjustment process, to remove moisture from the dewatered cake, and form a moisture adjusted material; and performing a carbonization process, in which the moisture adjusted material is continuously carbonized, to form a carbide, wherein said performing a moisture adjustment process includes mixing a portion of the carbide into the dewatered cake to remove the moisture therefrom.

2. The method as recited in claim 1, where said performing a moisture adjustment process includes lowering a moisture content of the dewatered cake to about 45%.

3. The method as recited in claim 1, wherein said performing a dewatering process includes using a pressing machine.

4. The method as recited in claim 3, wherein said using a pressing machine includes using first and second, sequentially arranged dewatering devices.

5. The method as recited in claim 1, wherein said performing a carbonization process includes using a rotatably-mounted furnace having a tapered inside.

6. The method as recited in claim 5, wherein said using a rotatably-mounted furnace includes using a rotatably-mounted furnace having an inlet for receiving the moisture adjusted material, and an outlet for discharging the carbide, the inlet having a larger diameter than the outlet.

7. The method as recited in claim 1, further comprising granulating the moisture adjusted material before said performing a carbonization process.

8. The method as recited in claim 1, further comprising selecting the water-containing organic substance from the group consisting of sludge cakes, and the lees of wine, spirits or beer.

9. A method of producing a carbide from a water-containing organic substance, comprising:

performing a dewatering process to reduce a moisture content of a water-containing organic substance from the range of about 92% to about 94%, to the range of about 65% to about 68%, and form a dewatered cake;

performing a moisture adjustment process, to remove moisture from the dewatered cake, and form a moisture adjusted material; and performing a carbonization process, in which the moisture adjusted material is continuously carbonized, to form a carbide.

10. The method as recited in claim 9, where said performing a moisture adjustment process includes lowering a moisture content of the dewatered cake to about 45%.

11. The method as recited in claim 10, wherein said performing a dewatering process includes using a pressing machine.

12. The method as recited in claim 1, wherein said using a pressing machine includes using first and second, sequentially arranged dewatering devices.

13. The method as recited in claim 9, wherein said performing a carbonization process includes using a rotatably-mounted furnace having a tapered inside.

14. The method as recited in claim 13, wherein said using a rotatably-mounted furnace includes using a rotatably-mounted furnace having an inlet for receiving the moisture adjusted material, and an outlet for discharging the carbide, the inlet having a larger diameter than the outlet.

15. The method as recited in claim 9, further comprising granulating the moisture adjusted material before said performing a carbonization process.

16. The method as recited in claim 9, further comprising selecting the water-containing organic substance from the group consisting of sludge cakes, and the lees of wine, spirits or beer.

17. A method of producing a carbide from a water-containing organic substance, comprising:

dewatering a water-containing organic substance, to reduce a moisture content therein from the range of about 92% to about 94%, to the range of about 65% to about 68%, and form a dewatered cake;

adjusting a moisture content in the dewatered cakes, to remove moisture therefrom, and form a moisture adjusted material; and continuously carbonizing the moisture adjusted material, to form a carbide.

* * * * *